United States Patent
Drazic

(10) Patent No.: US 7,717,578 B2
(45) Date of Patent: May 18, 2010

(54) MULTIPLE LAMP ILLUMINATION SYSTEM WITH POLARIZATION RECOVERY AND INTEGRATION

(75) Inventor: Valter Drazic, Betton (FR)

(73) Assignee: Thomson Licensing, Boulogne Billancourt (FR)

( * ) Notice: Subject to any disclaimer, the term of this patent is extended or adjusted under 35 U.S.C. 154(b) by 517 days.

(21) Appl. No.: 10/592,340

(22) PCT Filed: Mar. 10, 2005

(86) PCT No.: PCT/EP2005/051093

§ 371 (c)(1),
(2), (4) Date: Jun. 18, 2007

(87) PCT Pub. No.: WO2005/088365

PCT Pub. Date: Sep. 22, 2005

(65) Prior Publication Data

US 2008/0019009 A1    Jan. 24, 2008

Related U.S. Application Data

(60) Provisional application No. 60/552,284, filed on Mar. 11, 2004.

(51) Int. Cl.
   *F21V 9/14* (2006.01)
(52) U.S. Cl. .................. 362/19; 362/241; 362/243; 362/551; 362/554; 362/583; 359/487; 359/496; 359/618; 359/629
(58) Field of Classification Search ............... 362/19, 362/241, 243, 551, 554, 556, 560, 583; 359/487, 359/496, 618, 629
See application file for complete search history.

(56) References Cited

U.S. PATENT DOCUMENTS

| 4,576,436 | A | 3/1986 | Daniel |
| 6,332,693 | B1 | 12/2001 | Dove et al. |
| 7,180,666 | B2 * | 2/2007 | Benoit et al. ............. 359/496 |
| 7,195,373 | B2 * | 3/2007 | Ishii et al. ............... 362/241 |
| 2008/0019009 | A1 * | 1/2008 | Drazic ...................... 359/636 |

FOREIGN PATENT DOCUMENTS

EP    0802443    10/1997

OTHER PUBLICATIONS

Search Report Dated May 30, 2005.

* cited by examiner

*Primary Examiner*—Stephen F Husar
(74) *Attorney, Agent, or Firm*—Robert D. Shedd; Harvey D. Fried; Richard LaPeruta

(57) ABSTRACT

An illumination system is provided for combining two or more light sources. A plurality of light sources radiate random polarization light. A plurality of collecting light pipes corresponds to the plurality of light sources. Each collecting light pipe has an entrance end disposed towards the respective light source. The collecting light pipes are laterally offset and overlapping opposite their respective entrance ends. A combining light pipe is disposed perpendicular to the collecting light pipes. A polarizing beam splitter and a mirror are sequentially arranged in each collecting light pipe essentially opposite the entrance end directing a first polarization light and a second polarization light, respectively upwards towards the combining light pipe. The combining light pipe has an entrance end overlying the polarizing beam splitter and mirror of each collecting light pipe to collect and combine the light from each polarizing beam splitter and mirror.

16 Claims, 2 Drawing Sheets

MULTIPLE LAMP ILLUMINATION SYSTEM WITH POLARIZATION RECOVERY AND INTEGRATION

CROSS-REFERENCE TO RELATED APPLICATIONS

This application claims the benefit, under 35 U.S.C. §365 of International Application PCT/EP2005/051093, filed Mar. 10, 2005, which was published in accordance with PCT Article 21(2) on Sep. 22, 2005 in English and which claims the benefit of U.S. provisional patent application No. 60/552,284, filed Mar. 11, 2004.

FIELD OF THE INVENTION

The invention relates generally to a light projection system for use with a microdisplay.

BACKGROUND OF THE INVENTION

In existing light projection systems there is typically a tradeoff between optimum brightness and lamp life. One approach to this problem is to provide a system with two lamps. However, when such systems which are adapted for use with microdisplays, there is not adequate means for uniform illumination and polarization recovery. These systems are also limited to two lamps, and require two relay lenses increasing cost and space requirements.

SUMMARY

According to an exemplary embodiment of the present invention, an illumination system is provided for combining two or more light sources. The illumination system comprises a plurality of light sources radiating random polarization light and a light pipe system that combines the light from the light sources and provides a high brightness uniform illumination. The light pipe system includes a plurality of collecting light pipes corresponding to the plurality of light sources. Each collecting light pipe has an entrance end disposed towards the respective light source. The collecting light pipes are laterally offset and overlapping opposite their respective entrance ends. A combining light pipe is disposed perpendicular to the collecting light pipes. A polarizing beam splitter and a mirror are sequentially arranged in each collecting light pipe essentially opposite the entrance end directing a first polarization light and a second polarization light, respectively upwards towards the combining light pipe. The combining light pipe has an entrance end overlying the polarizing beam splitter and mirror of each collecting light pipe to collect and combine the light from each polarizing beam splitter and mirror.

BRIEF DESCRIPTION OF THE DRAWINGS

The present invention will next be described-with reference to the accompanying drawings, of which.

DETAILED DESCRIPTION

In applications requiring a very high brightness, like for example, digital cinema, it may be desirable to use more than one lamp in the illumination system for significantly boosting the light throughput. This disclosure describes such an architecture that has also the advantage of recovering the polarization and integrating the light beam for delivering a high brightness uniform illumination. Moreover, this system requires a reduced number of lenses for low cost and also for making the system more compact.

Figure 1:
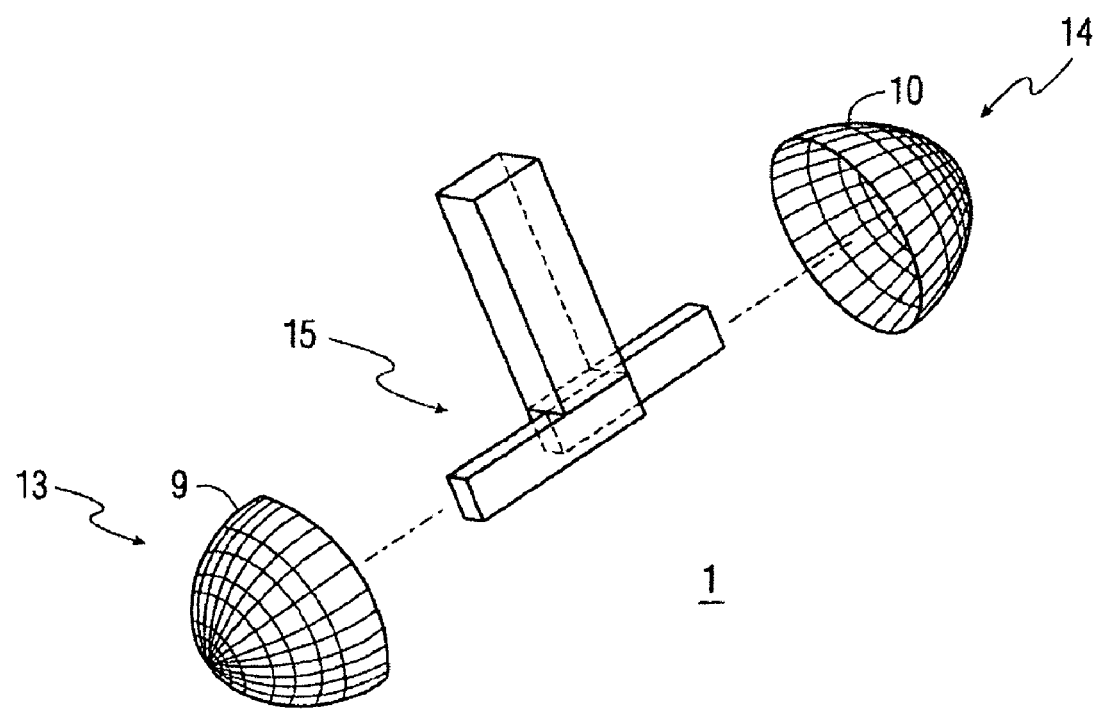
FIG. 1 is a perspective view of an illumination system according to an exemplary embodiment of the present invention.
Figure 2A:
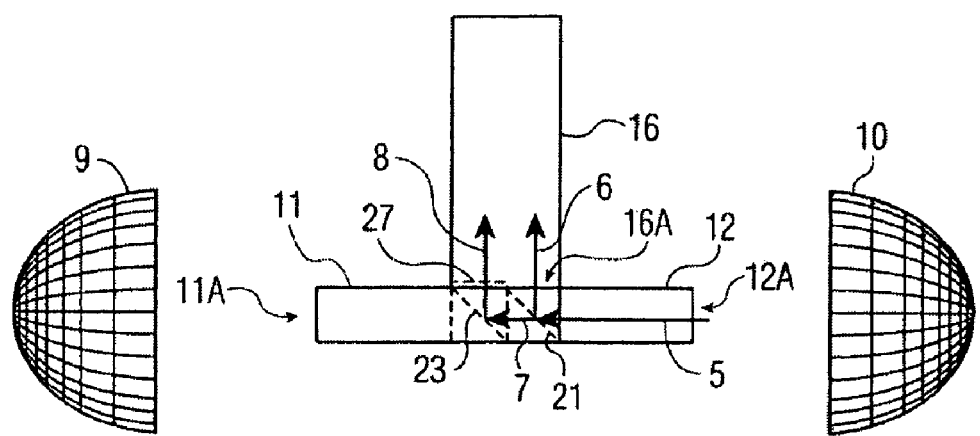
FIGS. 2A-2C show opposing side views and a top view, respectively, of the illumination system illustrated in FIG. 1.
Figure 2B:
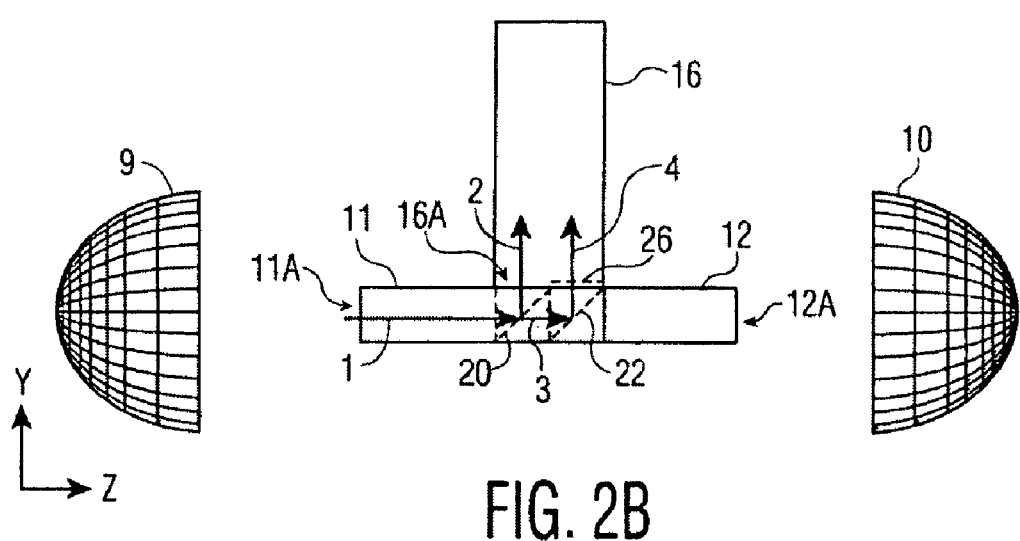
Figure 2C:
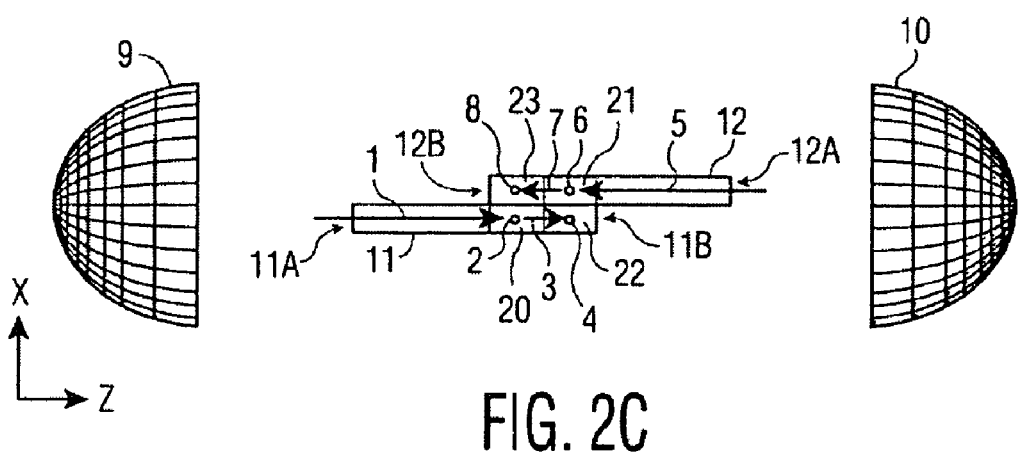

FIGS. 1-2C show a dual lamp system 1, however the following discussion is also applicable to a four lamp system. In the dual lamp scheme, a burner (not shown) is set into a light-collector/light-reflector 9, 10 for each of two oppositely directed lamps 13, 14 with a light pipe system 15 disposed between the lamps 13, 14. An elliptical reflector is well suited as a collector, but the collecting means could be different. There is a collecting lightpipe 11, 12 having an entrance end 11a, 12a at the secondary focal point of each light-collector 9, 10 where the light is focused. The second lamp 14 and light-pipe 11 are laterally offset from the first lamp 13 and lightpipe 12 by the width of the lightpipes, as shown in FIG. 2C. Opposite the entrance ends 11a, 12a, each light pipe has a terminal end 11b, 12b, which terminal ends 11b, 12b overlap in the axial directions of the collecting light pipes 11, 12.

Randomly polarized light 1, 5 from each burner is injected by the collector/reflector 9, 10 into the corresponding light-pipe 11, 12 at the entrance end 11a, 12a. The randomly polarized light 1, 5 gets mixed by reflection inside the first and second collecting lightpipes 11, 12, as shown in FIGS. 2A-2B. The first and second collecting lightpipes 11, 12 do not need to be very long since there will be a combining lightpipe 16 that extends perpendicular to the collecting light pipes 11, 12 and combines the light from the first and second collecting light pipes 11, 12. In each collecting lightpipe 11, 12, proximate the end opposite the entrance 11a, 12a, there is a 45 degree polarizing beam splitter (PBS) 20, 21 that reflects s-polarization light 2, 6 upward and lets p-polarization light 3, 7 through. The p-polarization light 3, 7 is then reflected upward by a mirror 22, 23 disposed adjacent the PBS 20, 21, and converted into s-polarization light 4, 8 by a half-wave plate (HWP) 26, 27 above the mirror and perpendicular to the path of the reflected light. Thus, the lightpipe system 15 recovers the opposite polarization light (i.e., p-polarized light 3, 7) at the same time that it combines the light from the two lamps 13, 14.

As shown in FIGS. 2A-2C, the PBS's 20, 21 and the mirrors 22, 23/HWP's 26, 27 form four rectangular areas that radiate s-polarized light upwards into the combining lightpipe 16. The combining light pipe 16 has an entrance end 16a that overlies the four rectangular areas, such that essentially all of the light that is directed upwards enters the combining light pipe 16. The combining lightpipe 16 combines the light by reflection to get a spatially and spectrally uniform illumination at its output. The output from the combining lightpipe 16 is then ready to be imaged onto one or more microdisplays (not shown) with a relay lens (not shown). Thus, the two lamps 13, 14 require only one relay lens and not two separate relay lenses.

If the system that is to be illuminated is a "one in two" imager system there is no need for polarization recovery and the upwards folding system can just consist of a mirror at 45 degrees instead of the PBS and mirror combination. The cross-sections of the collecting lightpipes 11,12 are rectangular, having dimensions chosen to have an aspect ratio that makes the final cross-section of the combining lightpipe 16 have the aspect ratio of the imager(s). Usually the combining lightpipe 16 will have an aspect ratio of 4/3 or 16/9.

The system depicted in FIG. 1 performs three functions to get high luminous light output: (1) it converts a circular beam into a rectangular uniform beam, more appropriate to illuminate a microdisplay, (2) it recovers one polarization of light that would normally be lost if the illumination is used for liquid crystal based devices, and (3) it combines the light from two or more lamps.

What is claimed is:

1. A light pipe system for use in an illumination system, the light pipe system comprising:
   at least one pair of collecting light pipes having oppositely directed entrance ends and overlapping terminal ends;
   a polarizing beam splitter proximate the terminal end of each collecting light pipe directing a preferred polarization of light in a direction perpendicular to the collecting light pipe over a first rectangular area;
   a mirror adjacent the polarizing beam splitter in each collecting light pipe reflecting light passing through the polarizing beam splitter in the direction perpendicular to the collecting light pipe over a second rectangular area; the pair of collecting light pipes being offset laterally so that the first and second rectangular areas of one of the pair of collecting light pipes is adjacent the second and first rectangular areas, respectively, of the other one of the pair of collecting light pipes; and
   a combining light pipe perpendicular to the collecting light pipes and having an entrance end overlying the rectangular areas.

2. The light pipe system of claim 1, further comprising a half-wave plate adjacent each mirror to convert light passing through the adjacent polarizing beam splitter into opposite polarization light such that each rectangular area radiates light of the same polarization.

3. The light pipe system of claim 1 wherein the rectangular areas combine to form a larger rectangular area having an aspect ratio of 4/3.

4. The light pipe system of claim 1 wherein the rectangular areas combine to form a larger rectangular area having an aspect ratio of 16/9.

5. An illumination system, comprising:
   a plurality of light sources radiating random polarization light;
   a plurality of collecting light pipes corresponding to the plurality of light sources; each collecting light pipe having an entrance end disposed towards the respective light source; the collecting light pipes being laterally offset and overlapping opposite their respective entrance ends;
   a combining light pipe perpendicular to the collecting light pipes;
   a polarizing beam splitter and a mirror sequentially arranged in each collecting light pipe essentially opposite the entrance end directing a first polarization light and a second polarization light, respectively upwards towards the combining light pipe; the combining light pipe having an entrance end overlying the polarizing beam splitter and mirror of each collecting light pipe to collect and combine the light from each polarizing beam splitter and mirror.

6. The illumination system of claim 5, wherein each light source has a collector that focuses light on a second focal point and the entrance end of each collecting light pipe is disposes at the second focal point of a corresponding collector.

7. The illumination system of claim 5, wherein the polarizing beam splitters and the mirrors form four rectangular areas radiating light towards the combining light pipe, the rectangular areas combining to form a larger rectangular area corresponding to the entrance end of the combining light pipe.

8. The light pipe system of claim 7 wherein the rectangular areas combine to form a larger rectangular area having an aspect ratio of 4/3.

9. The light pipe system of claim 7 wherein the rectangular areas combine to form a larger rectangular area having an aspect ratio of 16/9.

10. The light pipe system of claim 5, further comprising a half-wave plate adjacent each mirror to convert light passing through the adjacent polarizing beam splitter into opposite polarization light such that each rectangular area radiates light of the same polarization.

11. An illumination system, comprising:
    a plurality of light sources radiating random polarization light;
    a plurality of collecting light pipes corresponding to the plurality of light sources; each collecting light pipe having an entrance end disposed towards the respective light source;
    a combining light pipe perpendicular to the collecting light pipes;
    a polarizing beam splitter disposed in each collecting light pipe essentially opposite the entrance end directing a first polarization light upwardly into the combining light pipe; and
    a mirror disposed in each light pipe adjacent the polarizing beam splitter reflecting light that passes through the polarizing beam splitter into the combining light pipe.

12. The illumination system of claim 11, wherein each light source includes a collector directing the light at a second focal point, and the entrance end of each of the collecting light pipes is disposed at the second focal point of the collector of the corresponding light source.

13. The illumination system of claim 11, wherein the polarizing beam splitters and the mirrors form four rectangular areas radiating light towards the combining light pipe, the rectangular areas combining to form a larger rectangular area corresponding to the entrance end of the combining light pipe.

14. The light pipe system of claim 13 wherein the rectangular areas combine to form a larger rectangular area having an aspect ratio of 4/3.

15. The light pipe system of claim 13 wherein the rectangular areas combine to form a larger rectangular area having an aspect ratio of 16/9.

16. The light pipe system of claim 11, further comprising a half-wave plate adjacent each mirror to convert light passing through the adjacent polarizing beam splitter into opposite polarization light such that each rectangular area radiates light of the same polarization.

* * * * *